United States Patent
Ono et al.

(10) Patent No.: US 6,913,414 B2
(45) Date of Patent: Jul. 5, 2005

(54) HOLDING MECHANISM OF ROTATING MEMBER

(75) Inventors: Mitsuyoshi Ono, Miyagi-ken (JP); Hirofumi Ooyama, Yokosuka (JP); Hiroshi Ishiyama, Toyota (JP); Yuichi Shirase, Achi-ken (JP)

(73) Assignee: Nifco Inc., Yokohama (JP)

( * ) Notice: Subject to any disclaimer, the term of this patent is extended or adjusted under 35 U.S.C. 154(b) by 0 days.

(21) Appl. No.: 10/175,331

(22) Filed: Jun. 20, 2002

(65) Prior Publication Data

US 2003/0026649 A1 Feb. 6, 2003

(30) Foreign Application Priority Data

Jun. 29, 2001 (JP) ........................................ 2001-199923

(51) Int. Cl.⁷ .............................................. F16B 21/00
(52) U.S. Cl. ................................................... 403/322.4
(58) Field of Search ................................ 403/415–417, 403/321, 322.1, 322.3, 322.4; 248/456, 457, 460

(56) References Cited

U.S. PATENT DOCUMENTS

| | | | | |
|---|---|---|---|---|
| 2,270,217 A | * | 1/1942 | North | ........................ 108/160 |
| 2,842,415 A | * | 7/1958 | Gustave | ................... 248/188.5 |
| 2,913,295 A | * | 11/1959 | Park | ........................... 108/160 |
| 4,068,095 A | | 1/1978 | Ghormley et al. | |
| 4,460,146 A | | 7/1984 | Raggiotti | |
| 4,565,407 A | | 1/1986 | Brautigam | |
| 5,833,178 A | * | 11/1998 | Plasse et al. | ............. 248/447 X |
| 5,915,661 A | * | 6/1999 | Silverman et al. | ...... 248/456 X |
| 6,264,160 B1 | * | 7/2001 | Wells | ..................... 248/456 X |

FOREIGN PATENT DOCUMENTS

| | | |
|---|---|---|
| GB | 344852 | 3/1931 |
| GB | 723162 | 2/1955 |

\* cited by examiner

*Primary Examiner*—John R. Cottingham
(74) *Attorney, Agent, or Firm*—Manabu Kanesaka

(57) ABSTRACT

A holding mechanism for a rotating member includes a main member having a rotating shaft; a leg member rotationally attached to the rotating shaft to change from a housed state to a stand-up state; and a stopper formed on the main member at a position away from the rotating shaft. The stopper holds the stand-up state of the leg member. The leg member in the stand-up state can be rotated to the housed state by pushing the leg member.

9 Claims, 10 Drawing Sheets

HOLDING MECHANISM OF ROTATING MEMBER

BACKGROUND OF THE INVENTION AND RELATED ART STATEMENT

The invention relates to a holding mechanism of a rotating member.

Heretofore, there has been known a mechanism wherein a leg member rotated around a rotating shaft is transferred between a stand-up state and a housed (lying-down) state. In such a mechanism, there has been proposed a holding mechanism for holding a rotating member, such as a leg member, in the stand-up state.

For example, as shown in FIG. 10, in a holding mechanism 100, a leg member 106 is rotatably supported around a rotating shaft 104 by a main member 102. When the leg member 106 is rotated from the housed state (solid line portion) to the stand-up state (two-dotted chain line portion), a cut surface 104A of the rotating shaft 104 abuts against a plate spring 108 sandwiching the rotating shaft 104 to thereby engage the rotating shaft 104 (refer to the solid line state→the two-dotted chain line state, in FIG. 10). As a result, the leg member 106 is held in the stand-up state.

In addition to this, as shown in FIG. 11, there has been also known a holding mechanism 120 wherein a leg member 126 is rotatably supported around a rotating shaft 124 by a main member 122. Also, a leg member 126 is urged in the housing direction on a side of an arrow X1 relative to an intermediate position P, and the leg member 126 is urged in the stand-up direction on a side of an arrow X2 relative to the intermediate position P, by a turn-over spring 130 supported at both ends thereof by the leg member 126 and a supporting portion 128 on the main member. In other words, the leg member 126 is held in the stand-up state by the turn-over spring 130.

It is possible to process the shape (cut surface 104A and the like) of the shaft 104 of the holding mechanism 100 if the shaft is integrally made of a resin. However, since the rotating shaft 104 is made of the resin, in case the holding mechanism 100 is used as, for example, a stand for a deck board, there has been a defect such that the strength is not sufficient. On the other hand, in order to obtain sufficient strength, when the shaft is made of metal, the cost for cutting work of the cut surface becomes high.

Also, since the plate spring 108 abuts against the rotating shaft 104, an area of the main member 102 (hereinafter referred to as "holding portions") rotationally supporting the rotating shaft 104 is reduced, so that the area will have an insufficient strength in the holding portion.

Further, depending on a portion of the rotating shaft 104 against which the plate spring 108 abuts, the plate spring 108 contracts or expands. Therefore, there has been a defect such that a space for the contraction and expansion of the plate spring 108 is required.

On the other hand, in case of the above holding mechanism 120, it is necessary to provide the supporting portion 128 for supporting one end of the turn-over spring 130 to the main member portion 122 at a position (the intermediate position P) where the urging direction of the turn-over spring 130 is reversed. Therefore, when the leg member 126 is in the housed state, the supporting portion 128 projects. Thus, there are defects such that the using condition and designing of the holding mechanism 120 are limited.

In view of the above defects, the present invention has been made and an object of the invention is to provide a holding mechanism of a rotating member, wherein a predetermined strength is obtained while holding a leg member in a stand-up state.

Further objects and advantages of the invention will be apparent from the following description of the invention.

SUMMARY OF THE INVENTION

According to the first aspect of the present invention, a holding mechanism of a rotating member includes: a main member rotationally supporting a rotating shaft; a leg member standing up from its housed state through integral rotation with the rotating shaft; and a stopper disposed at a position apart from the rotating shaft for holding the leg in the stand-up state.

Operations of the invention in the first aspect will be explained. The leg member stands up from the housed state (lying-down state) through the integral rotation with the rotating shaft supported by the main member, and is held in the stand-up state by the stopper. Since the stopper is located at a position apart from the rotating shaft, it is not necessary to specially process the shape and like of the rotating shaft (made of a resin), and the shaft can be made of metal, the cost of which is cheap. Therefore, a predetermined strength of the rotating shaft can be obtained. Also, since the holding mechanism of the invention is not structured such that the stopper is engaged with the rotating shaft, a sufficiently wide area for supporting the rotating shaft of the main member can be taken, and a specific strength can be obtained in the supporting portion of the main member.

According to the second aspect of the present invention, the holding mechanism of the rotating member in the first aspect further includes an engagement projection formed on the leg member and an engagement step formed on the stopper. Thus, when the leg member is in the stand-up state, the engagement step abuts against the engagement projection to thereby lock the leg member.

Operations of the invention according to the second aspect will be explained. The leg member can be held in the stand-up state through abutment of the engagement step formed on the stopper against the engagement projection formed on the leg member. Therefore, it is not necessary for the leg member to be held in the stand-up state by engaging with the rotating shaft, and the same operation as that in the first aspect of the invention can be attained.

According to the third aspect of the invention, in the second aspect, the stopper is rotated around a center shaft different from the rotating shaft provided to the main member; stands up from its housed state as the leg member stands up; and is always urged in the direction of returning to its housed state.

Operations of the invention according to the third aspect will be explained. Since the stopper is rotated around the center shaft different from the rotating shaft provided to the main member and is always urged to the side returning to the housed state, when the stand-up state through the engagement of the engagement projection on the leg member with the engagement step of the stopper is released, the leg member is automatically fallen down by the urging force (returned to the housed state).

According to the fourth aspect of the invention, in the third aspect, the acting direction of the moment acting on the engagement projection of the leg member from the engagement step of the stopper is changed to the stand-up direction when the leg member stands up.

The operations of the fourth aspect will be explained. Since the direction of the moment acting on the leg member through the engagement projection from the engagement step of the stopper always urged in its housing direction is changed in the stand-up direction when the leg member stands up, the leg member is locked.

According to the fifth aspect of the invention, in the first aspect, when the leg member is in the housed state, the stopper, the leg member and the main member are substantially flush.

Operations of the fifth aspect of the invention will be explained. When the leg member is in the fallen-down state (housed state), the stopper, leg member and main member are substantially flush or flat, so that the holding mechanism becomes compact, and the design and usage can be improved.

According to the sixth aspect of the invention, in the fifth aspect, the leg member has a U-character shape, and the main member and the stopper are housed inside the leg member in its housed state.

Operations of the sixth aspect will be explained. As described above, further, the holding mechanism of the rotating member is further made compact by housing the main member and the stopper inside the leg member.

DETAILED DESCRIPTION OF PREFERRED EMBODIMENT

A holding mechanism of a rotating member according to the present invention will be described in detail with reference to an embodiment hereunder.

Figure 1:
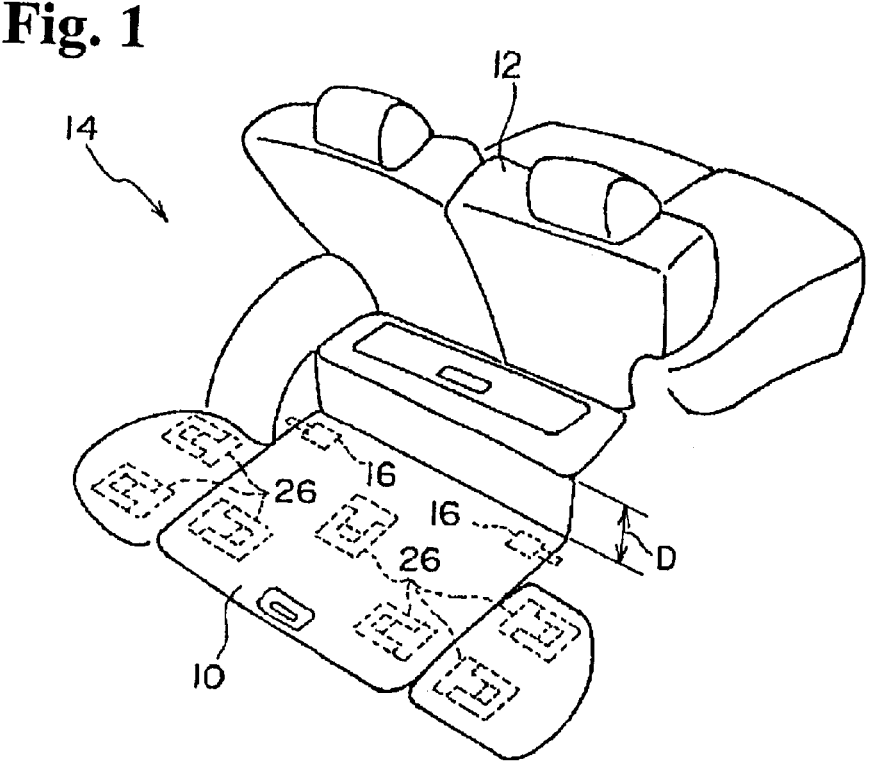
FIG. 1 is a perspective view for explaining a using state of a deck board of an embodiment according to the present invention.
Figure 2:
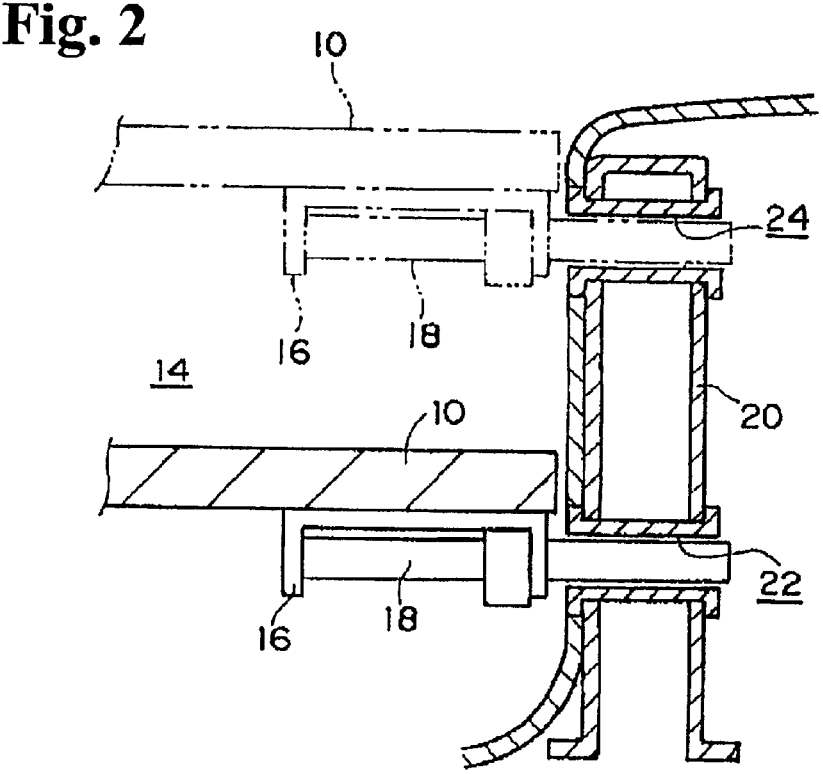
FIG. 2 is a sectional view for explaining a using state of the deck board of the embodiment according to the present invention.

First, a using state of a deck board to which the holding mechanism of the rotating member is applied will be explained. As shown in FIGS. 1 and 2, a deck board 10 is used in a baggage room 14 located in the rear of seats 12 of a wagon, and is rotatably held by inserting a shaft 18, which is inserted into bearing members 16 attached to both ends of the baggage room 14, into lower through-holes 22 or upper through-holes 24 of brackets 20 disposed on side surfaces of the baggage room 14.

In other words, the height of the deck board 10 is changed by changing the inserting position of the shaft 18. Incidentally, stands 26 are provided under a lower surface of the deck board 10 to hold the same horizontally. In case the deck board 10 is placed in a lower position, the stands 26 are fallen down, and in case the deck board 10 is raised, the stands 26 are raised to hold the deck board 10. As described above, by changing the height of the deck board 10, the baggage room 14 can be properly used by raising the deck board 10 or lowering the same without a step difference D.

Figure 3:
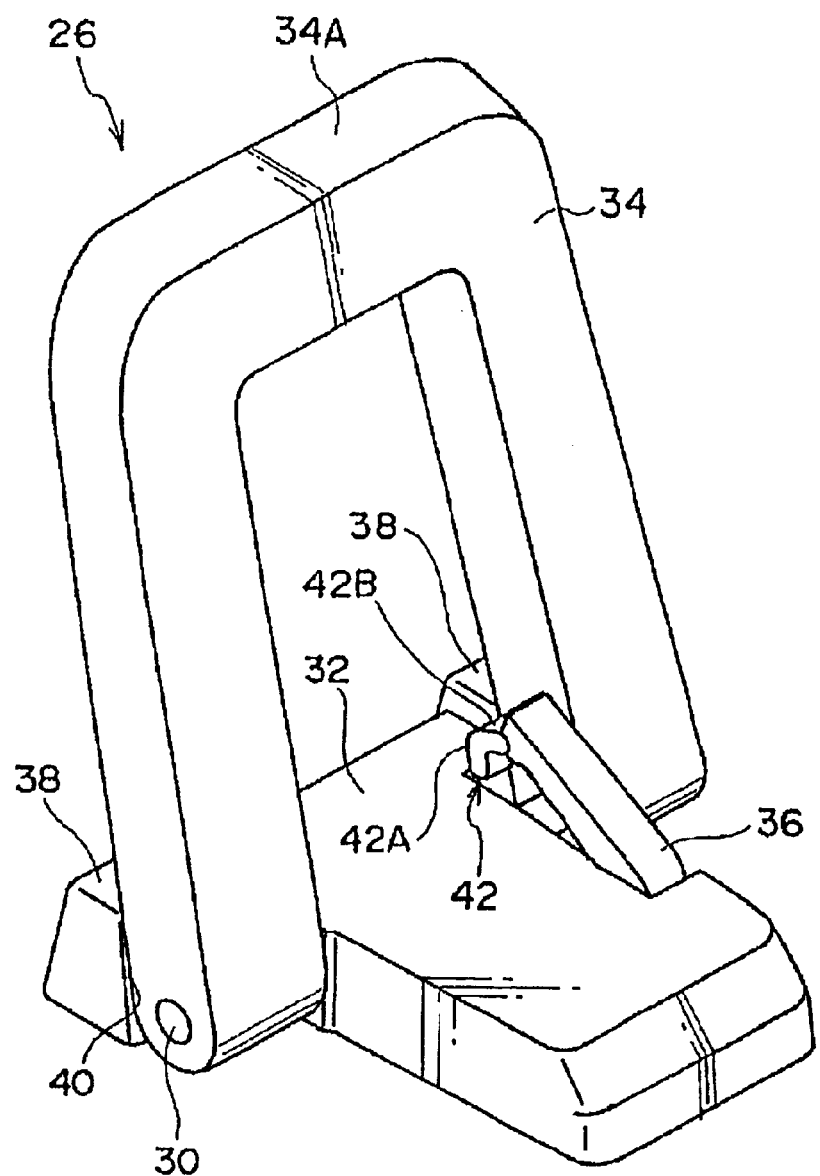
FIG. 3 is a perspective view of a stand in a stand-up state of the embodiment according to the present invention.

As shown in FIG. 3, the stand 26 is basically formed of a main member 32 for rotationally supporting a rotating shaft 30; a leg member 34 integrally rotating with the rotating shaft 30; and a stopper 36 for holding the stand-up state of the leg member 34.

The main member 32 includes projecting portions 38 projecting upward from both side portions on one end side of a rectangular shape thereof. Each projecting portion has an inclined surface 40 for limiting a stand-up angle.

Figure 4:
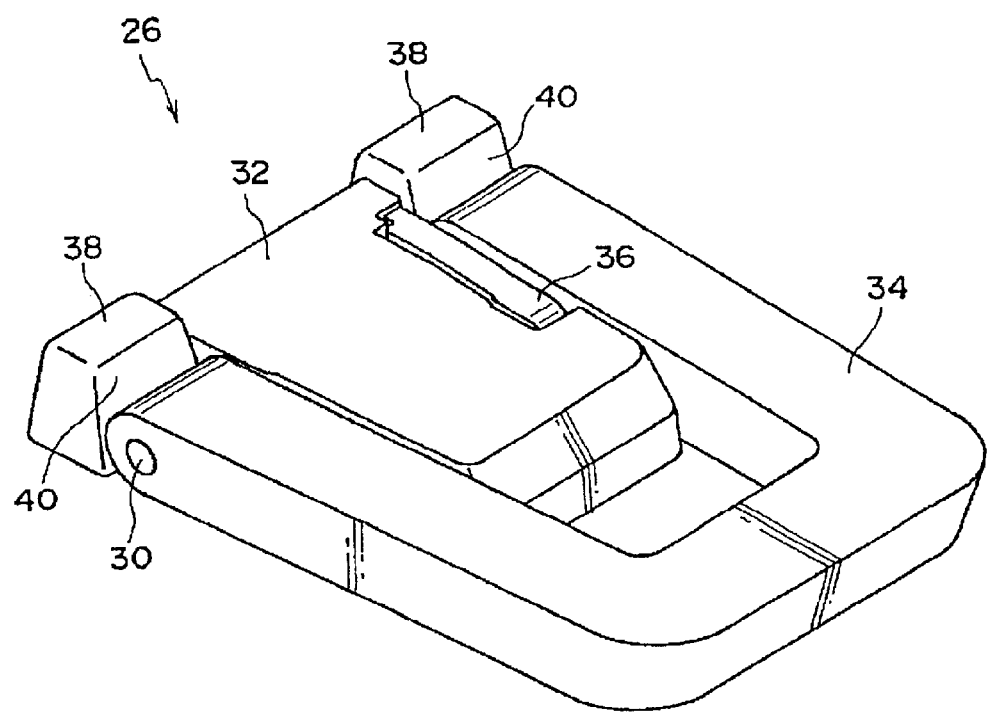
FIG. 4 is a perspective view of the stand in a housed state of the embodiment according to the present invention.

The leg member 34 is formed in a U-shape, and fixed to the rotating shaft 30 at its both ends. In other words, the leg member 34 is rotatable together with the rotating shaft 30. Also, in case the leg member 34 is fallen down (hereinafter referred to as "housed state"), as shown in FIG. 4, the main member 32 is positioned inside the leg member 34, so that the main member 32, the leg member 34 and the stopper 36 become a flat board state (refer to FIG. 7).

Also, there is formed an engagement projection 42 in about L-shape having a first plane 42A and a second plane 42B inside the leg member 34. The first plane 42A abuts against an engaging surface 48 of the stopper 36, described later, when the leg member 34 is housed, and the second plane 42B abuts against the engaging surface 48 when the leg member 34 stands up.

Figure 5:
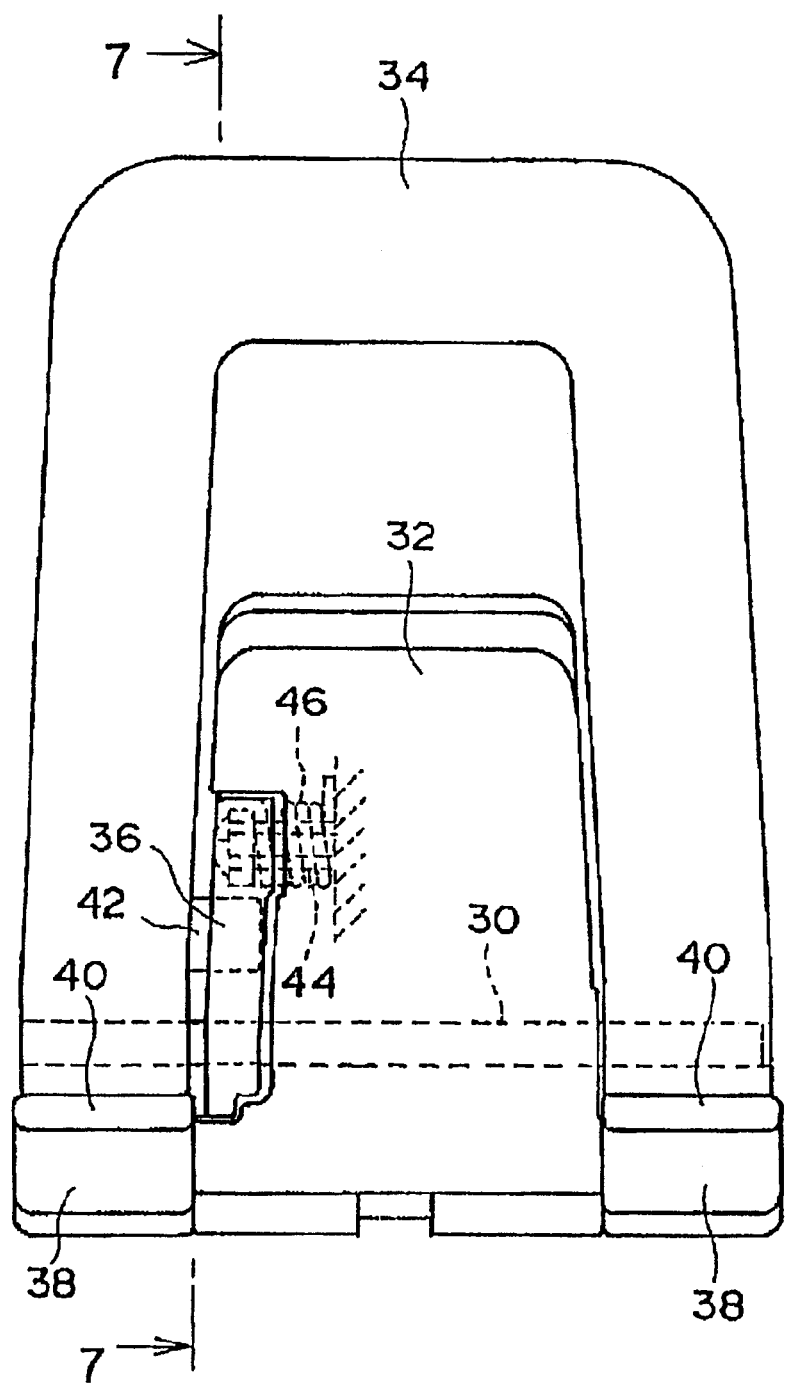
FIG. 5 is a plan view of the stand in the housed state of the embodiment according to the present invention.
Figure 7:
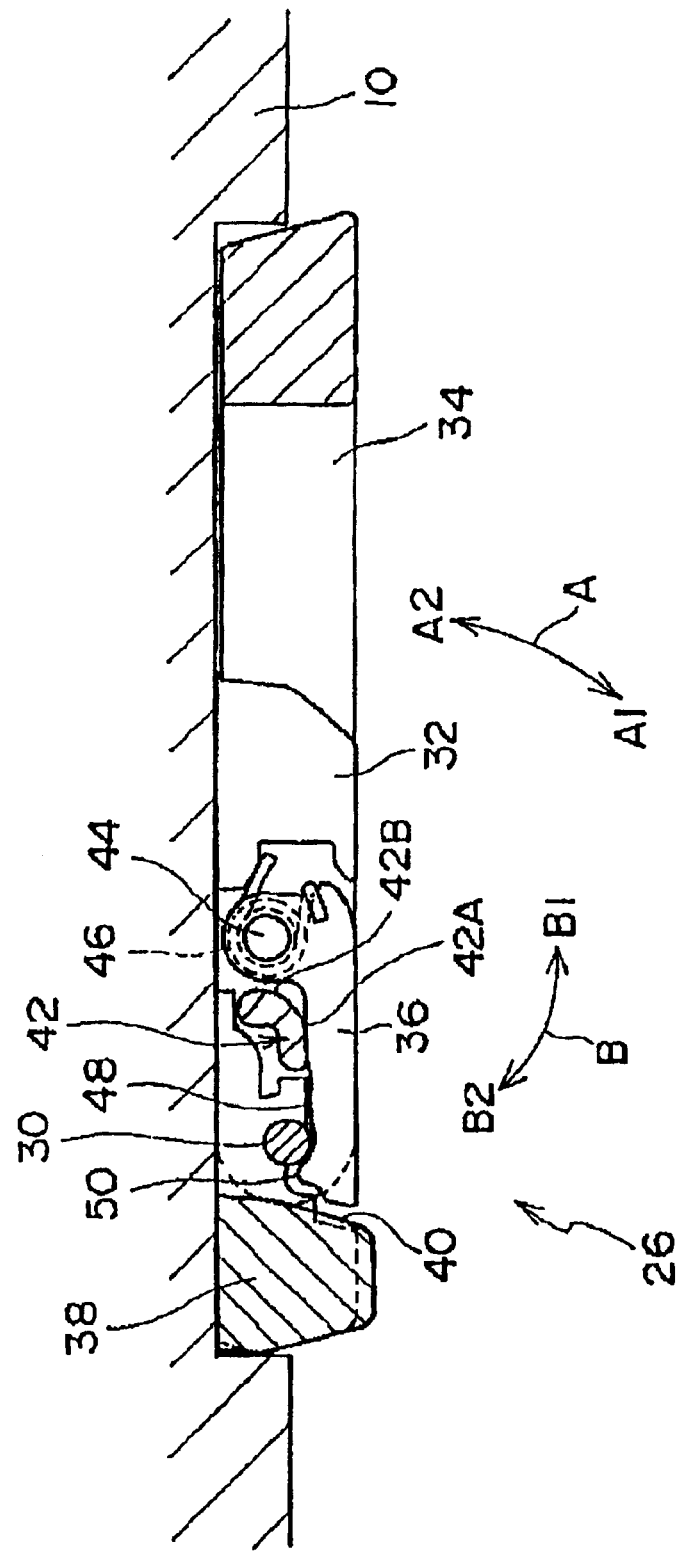
FIG. 7 is a sectional view, taken along line 7—7 in FIG. 5, of the stand in the housed state used for the deck board of the embodiment according to the present invention.

As shown in FIG. 5 and FIG. 7 (a sectional view taken along line 7—7 in FIG. 5), the stopper 36 is rotatable around a shaft 44 formed on a lower surface of the main member. Also, a spring 46 fixed to the main member 32 at one end and to the stopper 36 at the other end is wound around the shaft 44 to thereby always urge the stopper 36 toward the clock-wise direction, i.e. an arrow B2 direction.

Also, on the side of the rotating shaft of the stopper 36, there are formed an engaging surface 48 abutting against the engagement projection 42 of the leg member 34, and a projection (engaging portion) 50 for allowing the leg member 34 to abut against the engagement projection 42 of the leg member 34, to thereby engage the leg member 34 when the leg member 34 stands up.

Operations of the holding mechanism of the rotating member structured as described above will be explained. A case where the leg member 34 of the stand 26 is changed from the housed state to the stand-up state will be explained.

Figure 6:
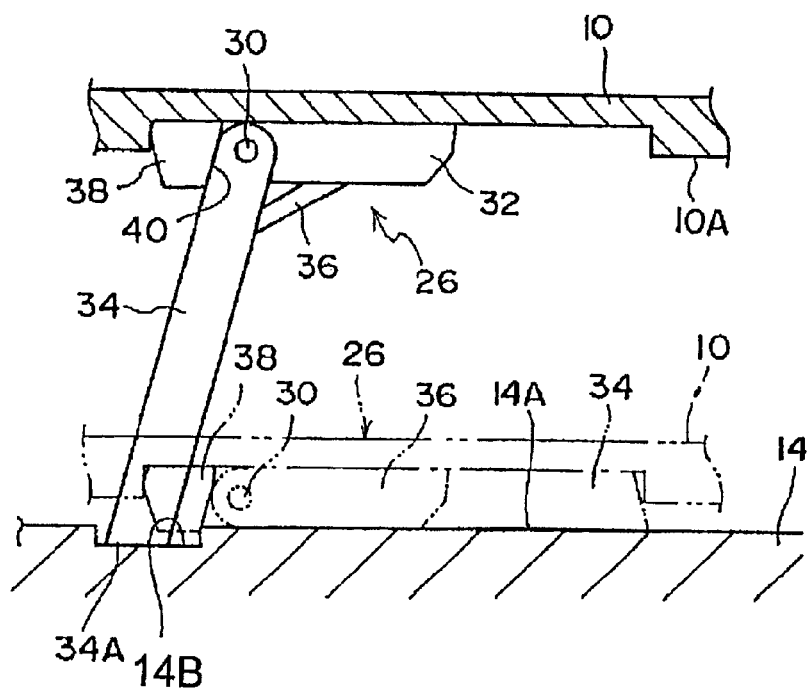
FIG. 6 is a side view showing the stand with respect to the deck board of the embodiment according to the present invention.

In case the deck board 10 is situated at the lower position, i.e. the leg member 34 is in the housed state, as shown by two-dotted chain lines in FIG. 6 or as shown in FIG. 7, the lower surfaces of the leg member 34, stopper 36 and main member 32 are flush with each other to thereby abut against a bottom surface 14A of the baggage room 14. Incidentally, the projecting portions 38 projecting from the lower surfaces of the main member 32 enter depressed portions 14B for installing the leg member provided on the bottom surface 14A. Therefore, the deck board 10 supported by the stands 26 becomes horizontal.

Also, the stand 26 is always urged in the direction to return to its housed state (an arrow B2 direction) by the urging force of the spring 46 to thereby prevent the leg member 34 from standing up by abutting against the engagement projection 42.

Figure 8:
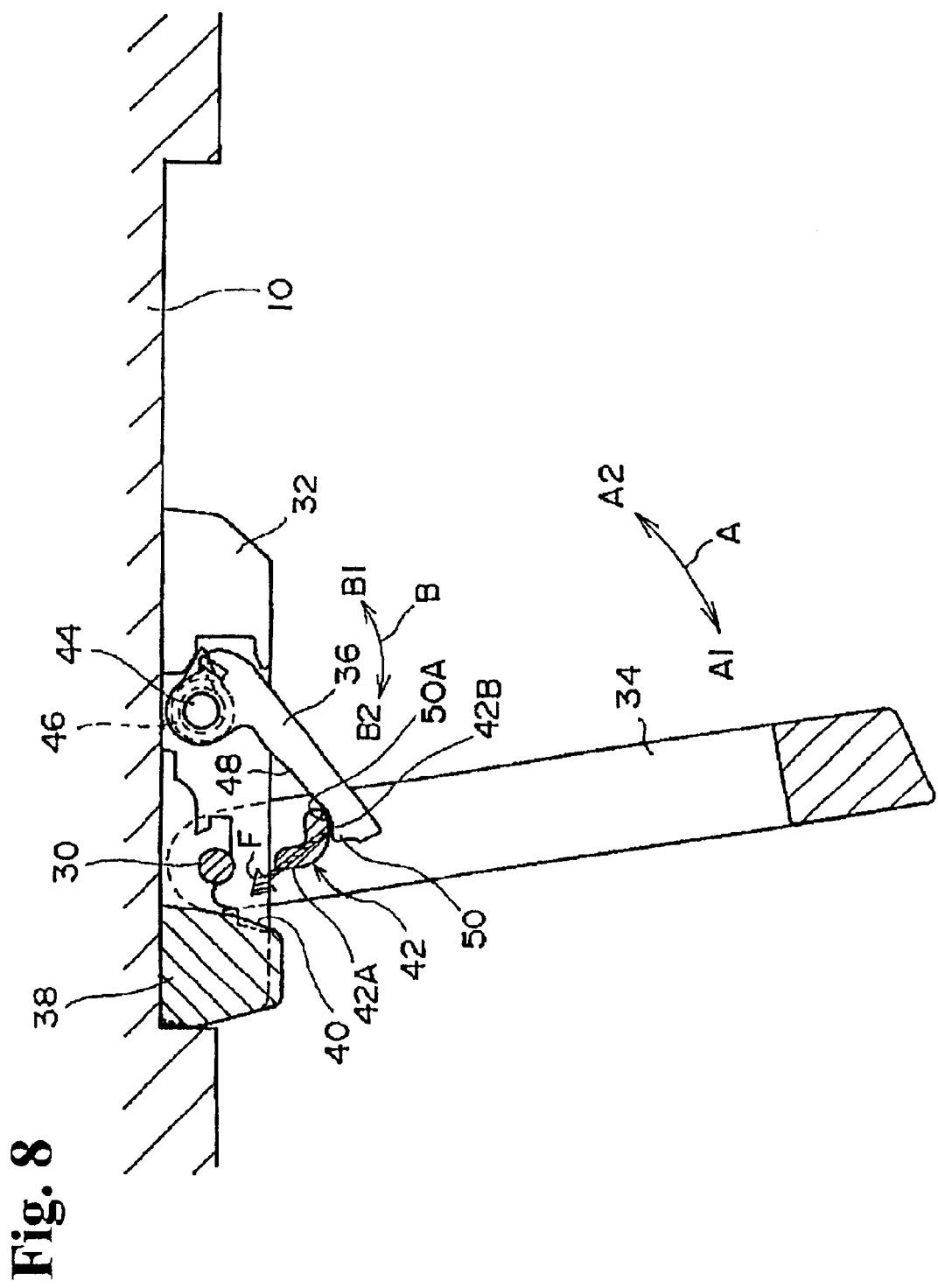
FIG. 8 is a sectional view of the stand on the way to the stand-up state used for the deck board of the embodiment according to the present invention.

In case the deck board 10 is located at the upper position, the leg member 34 is raised. First, the leg member 34 is held and rotated in the clock-wise direction (an arrow A1 direction in FIG. 7). Thus, the engagement projection 42 of the leg member 34 always abutting against the engaging surface 48 of the stopper 36 presses the stopper 36 in the arrow A1 direction. As a result, the stopper 36 rotates in an arrow B1 direction around the shaft member 44 against an elastic force of the spring 46. Under the condition, when the leg member 34 is rotated, the second plane 42B of the engagement projection 42 instead of the first plane 42A comes to abut against an inclined surface 50A of the projection 50 formed on the engaging surface 48 (refer to FIG. 8). Under the state, since an operation direction (refer to an arrow F in FIG. 8) of a moment acting on the leg member 34 through the engagement projection 42 from the stopper 36 is changed to the stand-up direction (an arrow A1 direction), even if the leg member 34 is made free, the stopper 36 (leg member 34) does not return to the housed state by the urging force of the spring 44.

Figure 9:
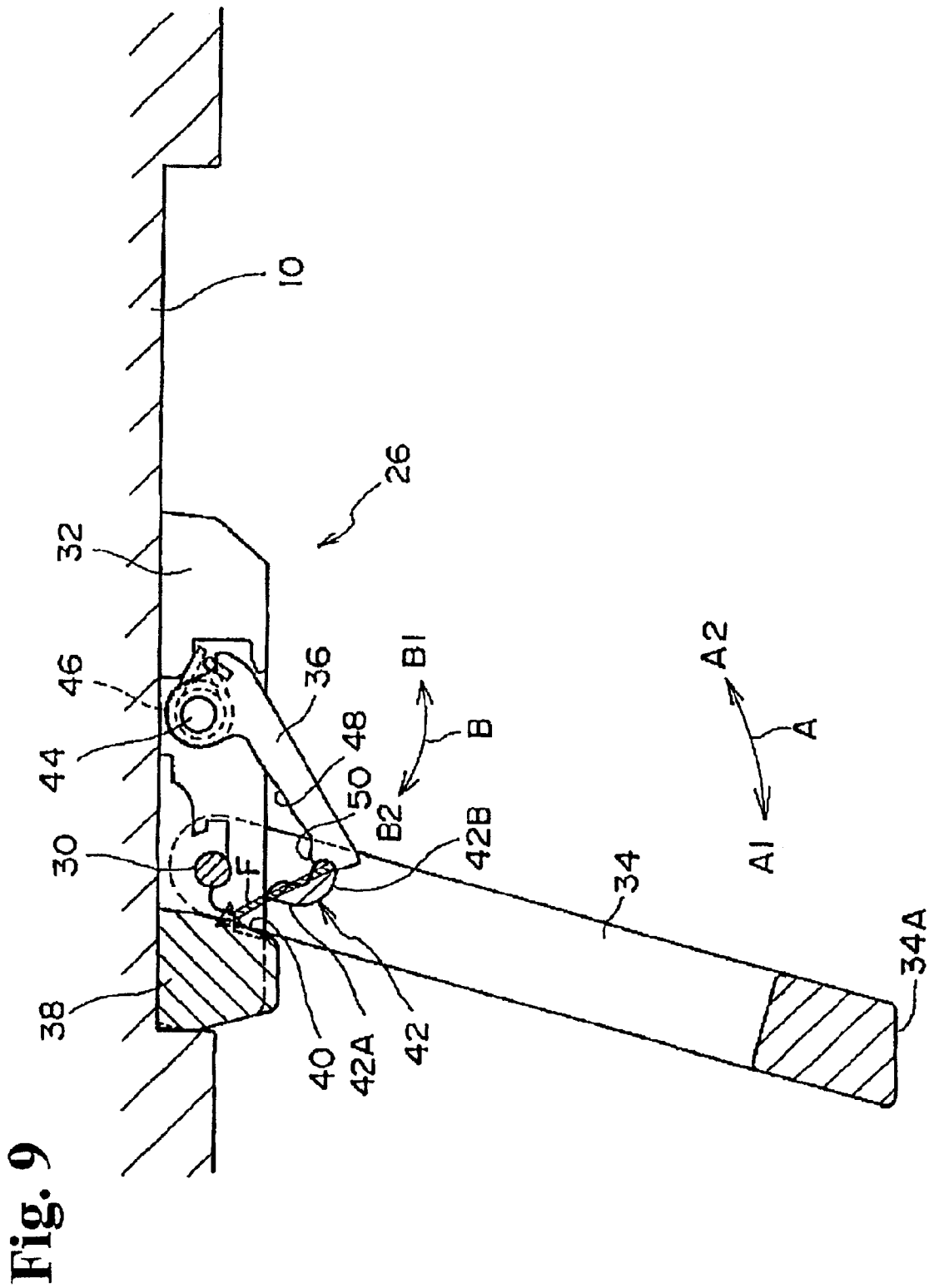
FIG. 9 is a sectional view of the stand in the stand-up state used for the deck board of the embodiment according to the present invention.
Figure 10:
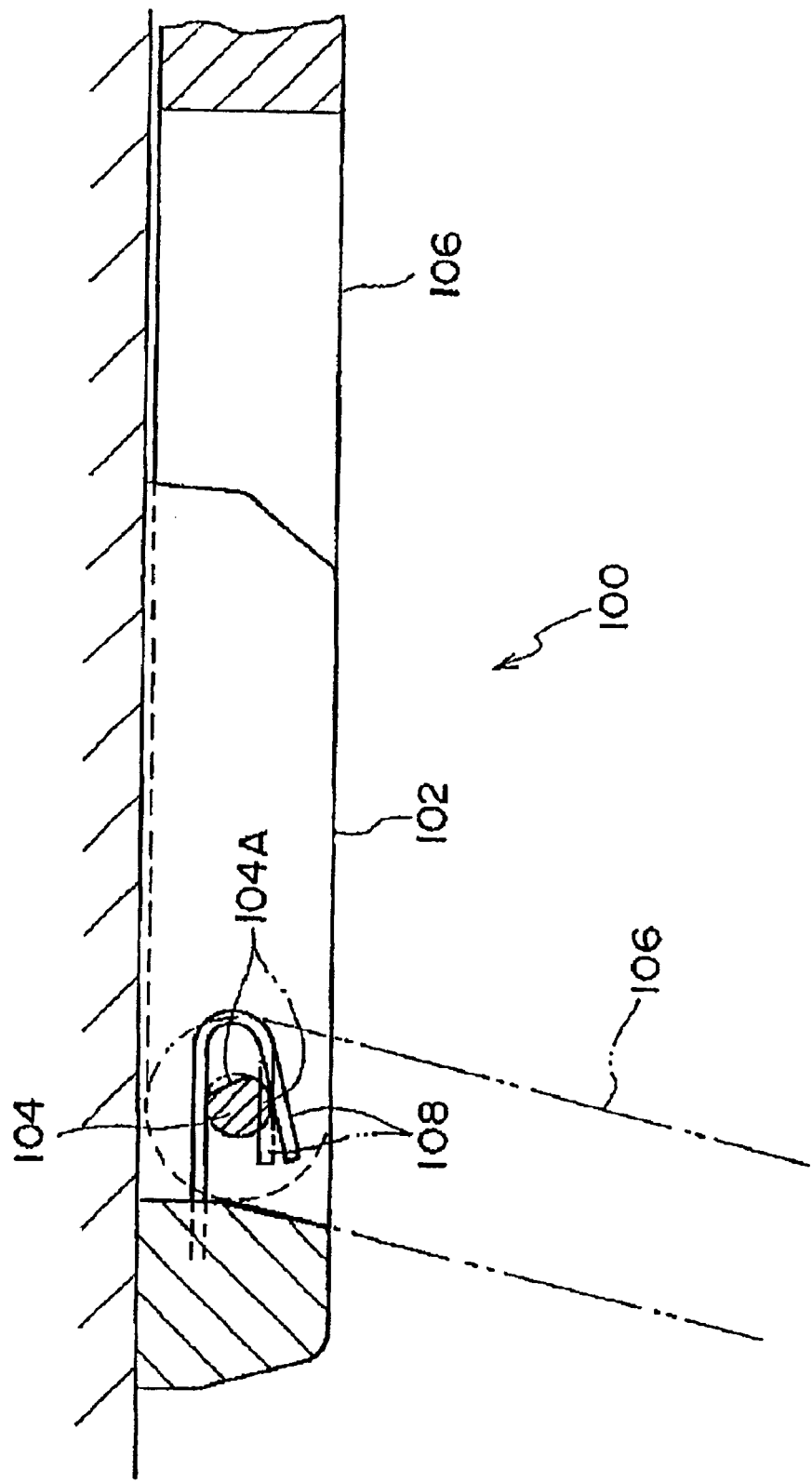
FIG. 10 is a sectional view of a holding mechanism of a leg member of a conventional example.
Figure 11:
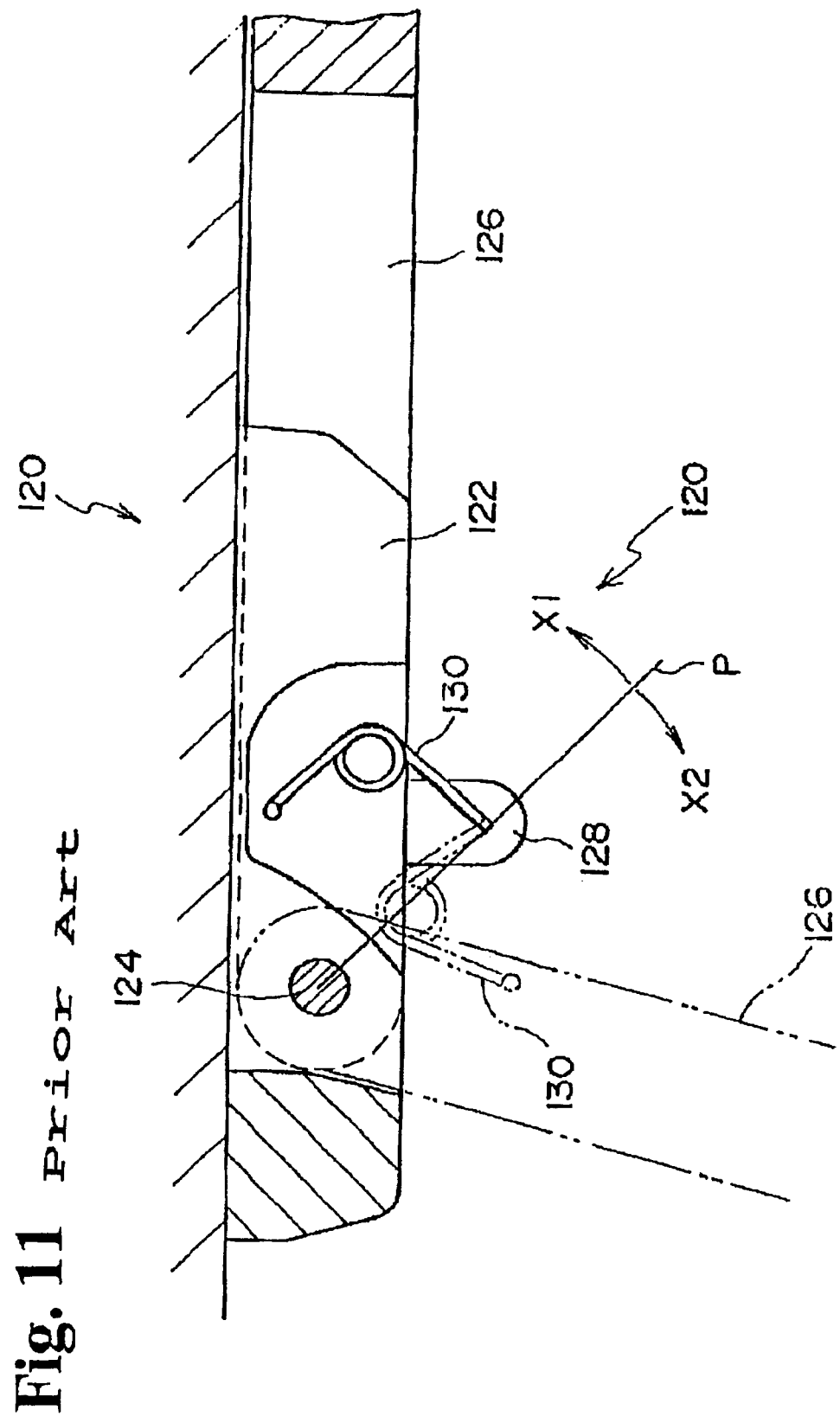
FIG. 11 is a sectional view of a holding mechanism of a leg member of another conventional example.

Further, in case the leg member 34 is rotated in the arrow A1 direction until the leg member 34 abuts against the inclined surface 40 of the main member 32 (the projecting portion 38), the engagement projection 42 of the leg member 34 passes over the projection 50 of the engaging surface 48 of the stopper 36 and the leg member 34 abuts against the inclined surface 40 of the main member 32 (projecting portion 38). By this time, since the operation direction (refer to an arrow F, in FIG. 9) of the moment acting on the leg member 34 from the stopper 36 is in the stand-up direction, even if the stopper 36 is urged in the arrow B2 direction by the spring 46, the stopper 36 does not return to the housed state. In other words, the stand-up state of the leg member 34 is locked. Incidentally, the feeling when the leg member 34 is locked by the engagement projection 42 passing over the projection 50 is noticed to provide good feeling.

Incidentally, with the action of the above-stated moment, although the leg member 34 is pressed toward the stand-up direction (an arrow A1 direction), since it is supported by the projecting portion 38 (the inclined surface 40), the leg member 34 is held at a predetermined angle.

Incidentally, with the stand-up state, an inclined surface 34A at the leading end of the leg member 34 becomes horizontal and enters the depressed portion 14B of the bottom surface 14A of the baggage room 14 to thereby support the deck board 10 horizontally (refer to FIG. 6).

In case the deck board 10 is moved from the upper stage to the lower stage, the above described operation is reversed. More specifically, by rotating the leg member 34 in the counter-clockwise direction (arrow A2 direction), the abutting position of the engagement projection 42 against the stopper 36 comes to the inclined surface 50A passing over the projection 50 (refer to FIG. 9→FIG. 8). Further, through rotation of the leg member 34 in the counter-clockwise direction, the acting direction of the moment acting on the leg member 34 from the stopper 36 is changed to urge the leg member 34 in the housing direction. As a result, the stopper 36 urged by the spring 46 is automatically returned to its housed state (refer to FIG. 8→FIG. 7). In other words, the leg member 34 is automatically returned to its housed state.

As described above, in the stopper 36 according to the present embodiment, since there is provided the stopper 36 for holding the stand-up state of the leg member 34 regardless of the rotating shaft 30 of the leg member 34, it is not necessary to form the rotating shaft 30 in a complicated shape. Therefore, the rotating shaft 30 can be made of metal, so that a sufficient strength as the leg portion of the deck board 10 can be obtained, and, at the same time, the production cost can be reduced.

Also, since the stopper 36 and the spring 46 are located at positions away from the rotating shaft 30, the supporting area of the shaft-supporting portion (holding portion) of the rotating shaft 30 of the main member 32 can not be substantially decreased, and the strength on the main member 32 against the action from the rotating shaft 30 can be sufficiently obtained.

Further, the main member 32 and the stopper 36 are housed inside the leg member 34 with the U-shape, so that the space can be reduced. Also, in case the leg member 34 is in the housed state (horizontal state), the leg member 34, main member 32 and the stopper 36 are flush, so that the using condition is very good when the deck board is placed on the bottom surface 14A of the baggage room 14.

Also, the projection 50 is formed on the engaging surface 48 of the stopper 36, and the stopper 36 is structured to lock the leg member 34 when the engagement projection 42 of the leg member 34 passes over the projection 50. Thus, its operational feeling is very good.

Incidentally, in the present embodiment, although a case where the present invention is applied to the stand 26 of the deck board 10 has been explained, the present invention is not limited thereto, and can be applied to any holding mechanism of the rotating member.

As described above, in the holding mechanism of the rotating member according to the present invention, the stand-up state of the rotating member can be held, and at the same time, a specific strength can be obtained.

While the invention has been explained with reference to the specific embodiment of the invention, the explanation is illustrative and the invention is limited only by the appended claims.

What is claimed is:

1. A holding mechanism for a rotating member comprising:
   a main member having a rotating shaft;
   a leg member rotationally attached to the main member through the rotating shaft to change from a housed state to a stand-up state relative to the main member and arranged on the main member to rotate from the housed state to the stand up state facing in one direction of the main member, said leg member having an engagement projection; and
   a stopper including one end portion rotationally attached to the main member at a position away from the rotating shaft for holding the stand-up state of the leg member, and the other end portion forming a free end having an engagement step, said stopper being supported only by the one end portion and arranged on the main member to rotate from the housed state to the stand-up state facing in a direction opposite to that of the leg member so that when the leg member stands up, the engagement step abuts against the engagement projection to lock the leg member.

2. A holding mechanism for a rotating member comprising:
   a main member having a rotating shaft;

a leg member rotationally attached to the main member through the rotating shaft to change from a housed state to a stand-up state relative to the main member, said leg member having an engagement projection; and a stopper rotationally attached to the main member at a position away from the rotating shaft for holding the stand-up state of the leg member and being arranged to rotate around a stopper shaft different from said rotating shaft disposed on the main member, said stopper having an urging member for urging the stopper to a housed state from a stand-up state and an engagement step so that when the leg member stands up, the engagement step abuts against the engagement projection to lock the leg member.

3. A holding mechanism for a rotating member as claimed in claim 2, wherein said stopper is arranged such that an acting direction of a moment acting on said engagement projection of said leg member from said engagement step of said stopper is changed to a stand-up direction when said leg member stands up.

4. A holding mechanism for a rotating member as claimed in claim 1, wherein when said leg member is in the housed state, said stopper, said leg member and said main member are flush.

5. A holding mechanism for a rotating member as claimed in claim 4, wherein said leg member has a U-shape, and in the housed state of the leg member, the main member and the stopper are housed inside the leg member.

6. A holding mechanism for a rotating member as claimed in claim 1, wherein said main member includes a surface abutting against the leg member in the stand-up state thereof, said stopper engaging the engagement projection to lock the leg member.

7. A holding mechanism for a rotating member as claimed in claim 2, wherein said stopper shaft is located away from the rotating shaft, and the stopper is directed toward the rotating shaft in the housed state of the stopper.

8. A holding mechanism for a rotating member as claimed in claim 7, wherein said engagement projection is located between the stopper shaft and the rotating shaft in the housed states of the leg member and the stopper.

9. A holding mechanism for a rotating member as claimed in claim 1, wherein said stopper is disposed over the engagement projection in the housed state without engaging thereto.

* * * * *